Figure 8:
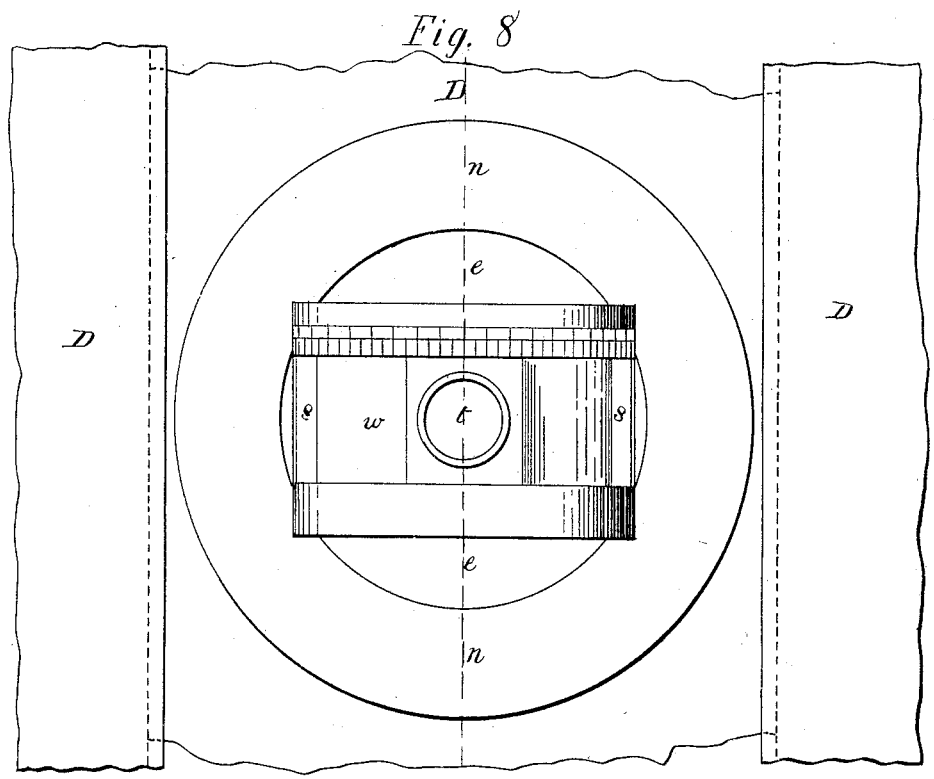

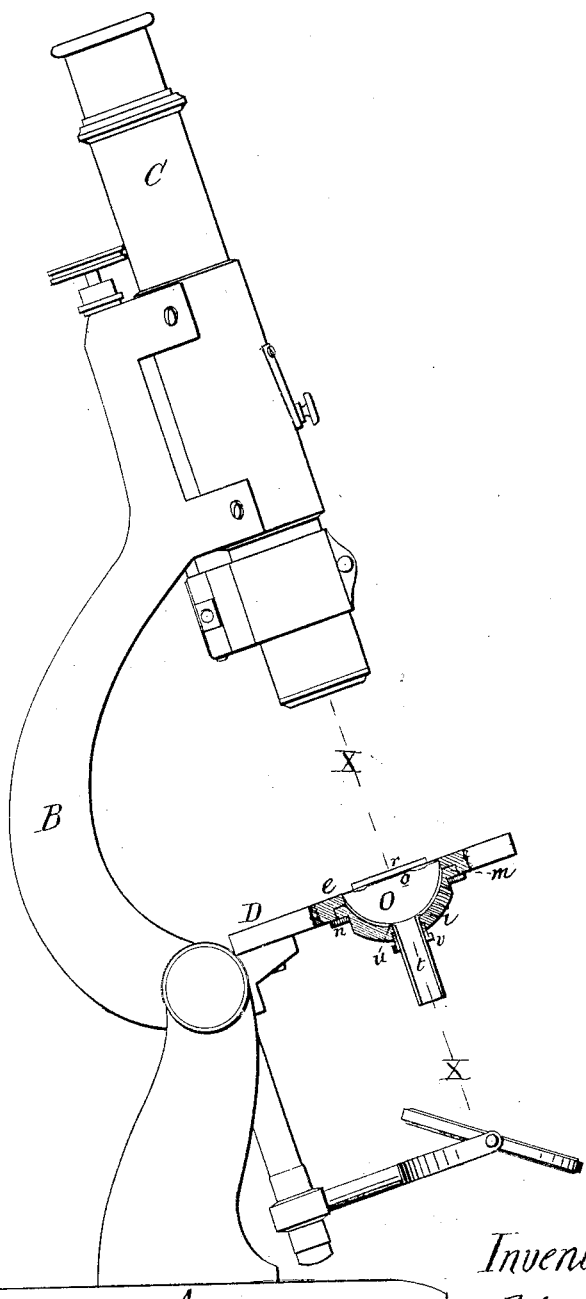

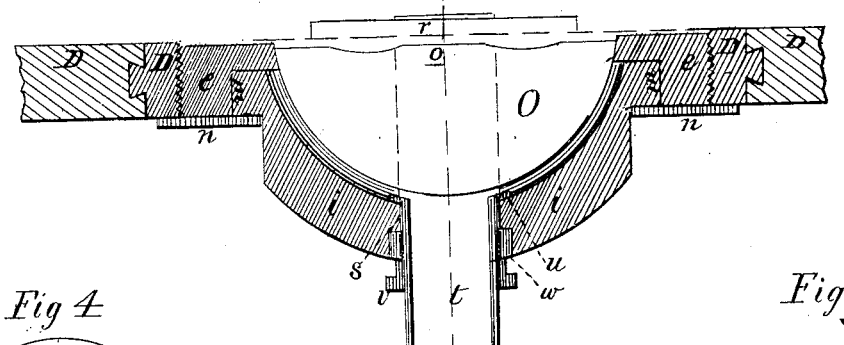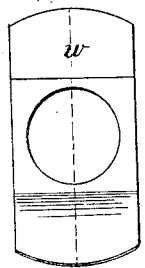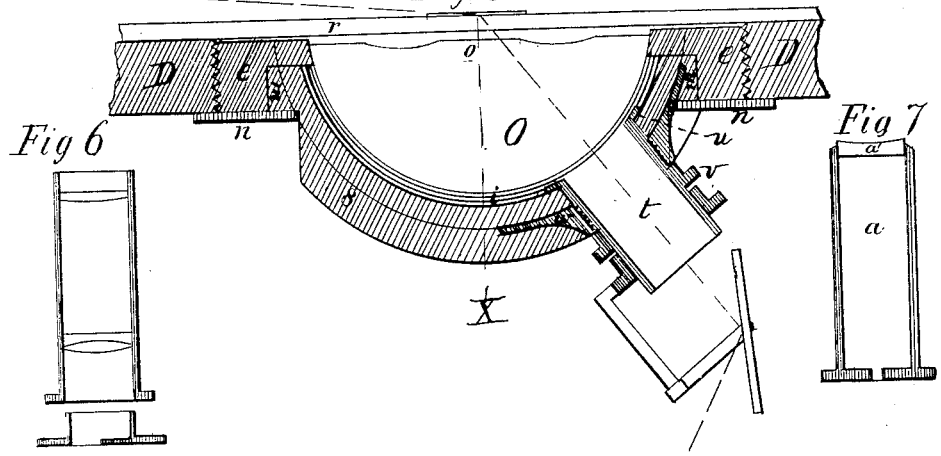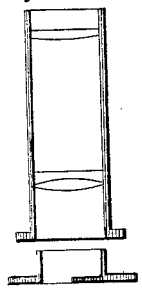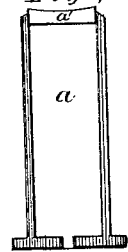

4 Sheets—Sheet 3.

R. B. TOLLES.
Microscope.

No. 198,783. Patented Jan. 1, 1878.

Attest
P. S. Yendell
Arthur McNally

Inventor
Robt. B. Tolles.

4 Sheets—Sheet 4.

R. B. TOLLES.
Microscope.

No. 198,783. Patented Jan. 1, 1878.

Attest
P. S. Yendell
Arthur McNally

Inventor
Robt. B. Tolles

UNITED STATES PATENT OFFICE.

ROBERT B. TOLLES, OF BOSTON, MASSACHUSETTS.

IMPROVEMENT IN MICROSCOPES.

Specification forming part of Letters Patent No. 198,783, dated January 1, 1878; application filed July 27, 1877.

*To all whom it may concern:*

Be it known that I, ROBERT B. TOLLES, of Boston, in the county of Suffolk and State of Massachusetts, have invented a new and useful Improvement in Microscopes, of which the following is a specification, reference being had to the accompanying drawings, forming part of the same.

In working with the microscope, more especially when objectives of high power are used, it is important that the ray for illuminating the object under examination should be under such control of the operator that he can direct it with facility and precision at any required angle upon that point in the optical axis of the instrument at which the object is placed, which point I have named the "object-place;" and the first branch of my invention consists in so constructing and combining mechanism for directing the ray that it may be swung upon an axis in a plane of the optical axis and passing through the object-place, so as to admit a ray to pass to the object-place, either along the optical axis or at any degree of obliquity that may be required, the surface on or against which such mechanism is swung being graduated into degrees of a circle and notated, so that the precise angle to the optical axis at which the ray is admitted may easily be observed and recorded, for the purpose of, among other things, facilitating a repetition of any observation.

In ordinary practice with the microscope, object-slides are used of varying thickness, which correspondingly raise and lower the object-place, so that the illuminating-ray, if directed obliquely to the optical axis by an illuminator turning on a fixed axis, would pass either below or above the object whenever any slide was used of a thickness greater or less, as most slides would be, than that to which the axis was set; and another branch of my invention consists in a method of compensating such changes of the object-place by correspondingly raising or lowering the axis of rotation of the mechanism for directing the ray, so that at whatever degree of obliquity it may be directed it shall with precision intersect the object-place, whether a thick or thin slide be in use.

Most microscopes have stages of too great thickness to permit the use of an illuminating-ray at the high degree of obliquity which nice observation of minute structures of extreme slenderness and tenuity of parts requires; and to compensate this defect is the object of another branch of my invention, which consists in mounting a plano-convex lens or a plano-cylindrical lens in or under the stage as an accessory, with the plane side of the lens uppermost, and arranged symmetrically with and at right angles to the optical axis of the instrument, and at such elevation that it will very nearly reach the under side of a thick slide mounted upon the stage; and when slides of less thickness are used, the lens is correspondingly lowered by adjusting mechanism to lower the illuminating-pencil to the level of the object. The space between the lens and the bottom of the slide should be occupied by a film of water or denser medium, which will not cause a material deflection of the passing ray. The plano-convex lens will, therefore, in this arrangement, have a thickness less than a hemisphere or a semi-cylinder by so much as the thickness of the thickest slides to be used on the stage.

I have made a circular track, concentric with the object-place and with the convex surface of the lens, to support and guide an illuminating-tube and its accessories, for admitting a ray of light to illuminate the object. This arrangement permits the tube to swing back and forth on its track, to traverse the convex face of the lens, and so direct the light-ray into it in the line of the optical axis, or at any angle thereto required for illuminating suitably an object for the widest aperture objectives.

The plano-convex lens I shall call a "traverse-lens." Any ray of light directed perpendicularly upon the convex face of this lens, and at an angle of, proximately, forty-one degrees obliquity to the optical axis, gives a breadth of interior pencil of, proximately, eighty-two degrees, and an emergent pencil into air of, proximately, one hundred and eighty degrees. Thus the traverse-lens receives a ray of light at a conveniently low angle for a thick stage, and refracts the ray at the highest angle required to illuminate an object to be viewed advantageously through an objective of the widest angle of aperture.

In this way I render a thick stage available for performing functions for which, heretofore, it has been deemed unsuited.

If an immersion objective should be used having an interior angle or breadth of pencil of more than eighty-two degrees, and the object under view should be mounted in a medium of higher refractive index than air, it is evident that the lens arranged as described is capable of giving access to the object of the broader pencil, transmissible by such objective. The degree of obliquity to the optical axis at which the ray is perpendicularly directed upon the convex surface of the lens is always equal to one-half of the breadth of the interior angle of the lens used. The exterior angle or breadth of the emergent pencil can always be ascertained from the interior angle by a well-known law of optics. Thus the graduated and notated arc, which indicates the angle at which the ray is directed upon and into the traverse-lens, enables the worker with the microscope to observe the widest interior pencil of the lens which any objective he may be using can transmit, when refracted from the plane face of the lens, and from such observation calculate the exterior angle, which is the exact measure of the angle of aperture of the objective. The graduated arc may have two sets of notation-symbols—one to indicate the interior angle of the pencil, and the other the equivalent exterior angle. There might be also, if preferred, a supplemental graduation for the exterior angle. These methods of measuring with so much facility the angle of aperture of an objective in the microscope avoid all necessity of estimating it, and enable the worker to fix and record the precise zone of aperture through which any phenomenon was observed.

In the drawings I have shown in Fig. 1 a side elevation of one of my cheap microscope-stands (a portion of the stage and accessories being shown in section) embodying the improvements herein described.

The base A of the stand has a curved arm, B, jointed to it, upon which the body C of the instrument is mounted. The stage D projects from the front of the curved arm, in the usual manner. A circular opening is made in the stage, into which a ring, $e$, is screwed from the under side. A metallic cup or hollow hemispherical dome, $i$, is connected to the ring $e$ by a circular flange or rim, $m$, which turns in a rabbet in the lower part of the ring $e$, in which it is held by an annular plate, $n$, screwed to the under side of the rim. By this arrangement the ring and dome are firmly connected, while the former may be screwed up and down in the aperture of the stage without interfering with the rotating of the latter in a plane parallel to the top of the stage. The axes of both the ring and dome are coincident with the optical axis of the body of the instrument, (indicated in the several figures, where it is shown by a dotted line, X X.) The ring has a plano-convex lens, O, called the "traverse-lens," mounted in it, with its plane side uppermost, in such manner that it can readily be removed and replaced. The plane face of the lens is cut away, except a small space at and round the center sufficient to refract the emergent illuminating-ray, and make contact, through the medium of water or other fluid, with the object-slide. The plane face $o$ of the lens is arranged in the ring $e$, so that when the latter is screwed up to the highest point it will almost touch the under side of the thickest slide $r$, mounted upon the stage D. The lens is lowered by turning down the ring $e$, to adapt it to a thinner slide. The dome $i$ has a slot, $s$, with parallel sides, cut symmetrically on both sides of and parallel with its axis. This slot forms a curved track concentric with the object-place, and is for the purpose of supporting and guiding an illumination-tube, $t$, held in it by flanges $u$ and $v$. The tube traverses the track freely from side to side of the dome, its axis being, in all positions, in the radius of the object-place.

A caliber of tube which I have found to work well is about four-tenths of an inch. The purpose of the tube is to direct the luminous ray to the object-place, when the traverse-lens is dismounted from the ring, at varying angles with the optical axis of the instrument, and, when the lens is mounted in the ring, to direct the ray, beam, or pencil at varying angles upon the convex face of the lens. The illumination-tube $t$ is fitted with a shutter, $w$, consisting of a thin plate, which closes the slot $s$ for a distance of about fifty degrees on each side of the tube, to exclude from the lens all such rays of light as would interfere with the proper illumination of the object.

The illumination-tube may be fitted, when deemed desirable, and more especially when the traverse-lens is removed, with a convex or other lens, or with a concave or plane mirror, or a refracting prism, for the condensation or other modification of the entering light.

The mouth of the illumination-tube may also be fitted with a shutter, to diminish and again increase at will the size, or change the form of the orifice through which the ray enters.

In Fig. 7 a modified form of the illumination-tube is shown, so far as necessary—viz., a tube, $a$, fitted to slide in the illuminating-tube, carrying at its inner end a plano-concave lens, $a'$, and at its outer end a cap having a diaphragm, with a narrow slit across its axis, to admit a thin beam or sheet of light.

The concave surface of the lens $a'$ is of the same curvature as the convex surface of the traverse-lens, and when in close contact they in effect cancel each other's curvature, and will act by their plane surfaces only upon the beam of light, which they will refract, in the manner of a prism, in all positions, except when the plane face of the lens $a'$ in the tube is at right angles to the optical axis. Every change in the angle of the illumination-tube, as it traverses the dome, changes the angles of the plane faces of the lenses to each other, and in effect forms a prism the angles of whose sides correspondingly vary.

This modification of the apparatus is specially adapted to the precise measuring of the angles of aperture of objectives.

Figure 9:
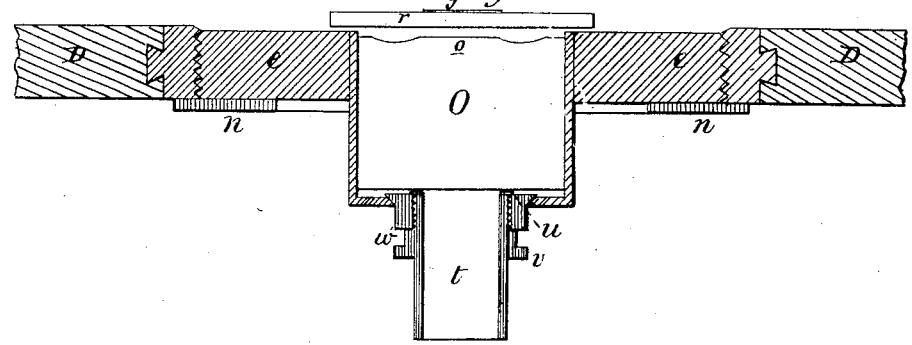

The dome may be dispensed with and the convex surface of the traverse-lens, especially when the cylindrical form is adopted, made to guide the illumination-tube and shutter. This modification is shown in Figs. 8 and 9.

Figure 10:
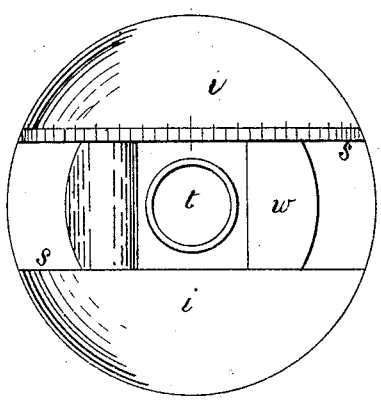
Figure 11:
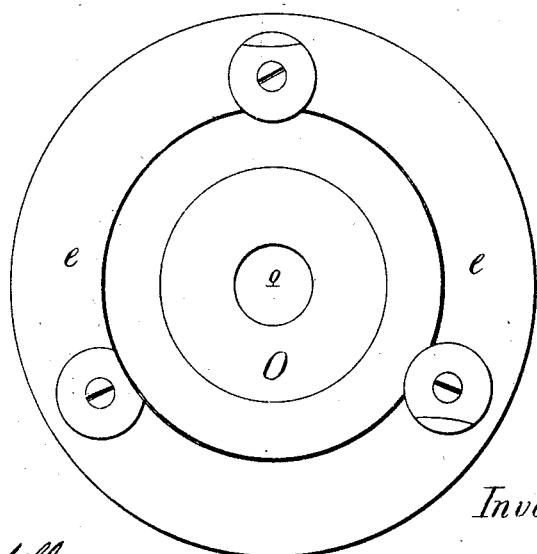

The details of construction herein described and referred to are shown more fully in the following, in addition to the figures of the drawings already mentioned, viz:

Fig. 2 shows a portion of the stage and illumination apparatus detached. Fig. 3 represents a similar section through the dotted line X X of Fig. 2. Fig. 4 represents a plan of the shutter detached from the tube. Fig. 5 represents a longitudinal section of the same. Fig. 6 represents a longitudinal section of an achromatic condenser fitted to slide in the illumination-tube, and with a cap having a perforated diaphragm. Fig. 10 represents a view, in elevation, of the illumination apparatus detached and inverted; and Fig. 11 represents a view of the parts shown in Fig. 10, reversed, to exhibit the turn-buttons for holding and releasing the traverse-lens.

The rotation of the dome $i$ in a plane parallel to the stage and round the optical axis enables the operator of the instrument to direct the light at almost any angle across the object-place, and thus, in a great measure, supersedes the necessity of rotating the stage.

The several devices which I have shown for reducing to practice my improved method of swinging the illumination-tube, and its accessories for directing the luminous ray at various and ascertained angles to the optical axis, but always in the radii of the object-place, are obviously but single examples of numerous devices by means of which such improved mode of operation might be carried into effect by any competent workman skilled in the art; but I have deemed it unnecessary to describe such devices herein, more especially as they will become still more obvious upon studying the specifications of other improvements in the microscope which I am about to file in the Patent Office in connection with other applications for Letters Patent.

I claim—

1. The swinging illumination-tube and illumination accessories for directing the illuminating-ray, and having for its axis of rotation the object-place, substantially as described.

2. The combination of a swinging illumination-tube and illumination accessories with adjusting mechanism, whereby its axis of rotation is made coincident with the object-place, whether the object under view be mounted in a thick or a thin slide, substantially as described.

3. The combination of a swinging illumination-tube with a graduated arc, whereby the angle which the direction of the ray makes with the optical axis may be observed and recorded, substantially as described.

4. The combination of a swinging illumination-tube and a graduated arc with a traverse-lens, whereby the angles of aperture of objectives may be measured, substantially as described.

5. The combination of the swinging illumination-tube and traverse-lens with a stage, whereby the light directed through the illumination-tube, at a conveniently low angle, will have emergence from the lens at the highest angle required for an objective of the widest angle of aperture, thus adapting a thick stage to the efficient examination of objects requiring high obliquity of illumination, substantially as described.

6. The combination of a traverse-lens, substantially as described, with a stage, whereby the light directed perpendicularly upon it, at a conveniently low angle, will emerge from the lens at the most oblique incidence required for an objective of the widest angle of aperture, substantially as described.

In witness whereof I have hereunto subscribed my name.

ROBERT B. TOLLES.

In presence of—
  P. S. YENDELL,
  ARTHUR McNALLY.